US010480860B2

(12) United States Patent
Frobose

(10) Patent No.: US 10,480,860 B2
(45) Date of Patent: Nov. 19, 2019

(54) CONVEYOR FURNACE

(71) Applicant: SANDVIK MATERIALS TECHNOLOGY DEUTSCHLAND GMBH, Düsseldorf (DE)

(72) Inventor: Thomas Frobose, Versmold (DE)

(73) Assignee: Sandvik Materials Technology Deutschland GmbH, Düsseldorf (DE)

( * ) Notice: Subject to any disclaimer, the term of this patent is extended or adjusted under 35 U.S.C. 154(b) by 263 days.

(21) Appl. No.: 14/889,592

(22) PCT Filed: Apr. 30, 2014

(86) PCT No.: PCT/EP2014/058809
§ 371 (c)(1),
(2) Date: Nov. 6, 2015

(87) PCT Pub. No.: WO2014/180727
PCT Pub. Date: Nov. 13, 2014

(65) Prior Publication Data

US 2016/0097593 A1 Apr. 7, 2016

(30) Foreign Application Priority Data

May 8, 2013 (DE) ........................ 10 2013 104 806

(51) Int. Cl.
*B23K 37/00* (2006.01)
*C21D 9/00* (2006.01)
(Continued)

(52) U.S. Cl.
CPC .................. *F27B 9/28* (2013.01); *C21D 1/26* (2013.01); *C21D 9/08* (2013.01); *F27B 5/04* (2013.01);
(Continued)

(58) Field of Classification Search
CPC ...... F27B 9/28; F27B 5/04; F27B 9/36; F27B 9/243; F27B 9/20; F27B 2009/124;
(Continued)

(56) References Cited

U.S. PATENT DOCUMENTS 1,858,484 A * 5/1932 Cooley .................. F27B 9/243 219/388
1,878,896 A * 9/1932 Sessions ................. F27B 9/243 432/235
(Continued)

FOREIGN PATENT DOCUMENTS

CH 564748 A5 * 7/1975 ............... C21D 1/63
CN 1508502 A 6/2004
(Continued)

OTHER PUBLICATIONS machine translation of JPH0339888A (no date available).*
machine translation of JPS6433025A (no date available).*

*Primary Examiner* — Kiley S Stoner
(74) *Attorney, Agent, or Firm* — Morgan, Lewis & Bockius LLP

(57) ABSTRACT

A conveyor furnace includes a muffle having an inlet opening and an outlet opening, with a heating device for heating a volume delimited by the muffle, and a closed conveyor belt manufactured at least partially from metal. The conveyor furnace includes another heating device which is arranged so that, during the operation of the conveyor furnace, the heating device heats a section of the conveyor belt extending outside of the muffle.

19 Claims, 2 Drawing Sheets

(51) Int. Cl.

| | |
|---|---|
| ***F27B 9/28*** | (2006.01) |
| ***F27B 5/04*** | (2006.01) |
| ***F27B 9/20*** | (2006.01) |
| ***F27B 9/24*** | (2006.01) |
| ***F27B 9/36*** | (2006.01) |
| ***C21D 1/26*** | (2006.01) |
| ***C21D 9/08*** | (2006.01) |
| ***F27D 3/00*** | (2006.01) |
| *F27B 9/12* | (2006.01) |

(52) U.S. Cl.
CPC ................ *F27B 9/20* (2013.01); *F27B 9/243* (2013.01); *F27B 9/36* (2013.01); *F27D 3/0024* (2013.01); *F27B 2009/124* (2013.01)

(58) Field of Classification Search
CPC ........... F27D 3/0024; C21D 9/08; C21D 1/26; B23K 1/008; B23K 1/0012
See application file for complete search history.

(56) References Cited

U.S. PATENT DOCUMENTS 1,940,554 A * 12/1933 Malinovszky ........ B28B 11/044 264/601
1,965,350 A * 7/1934 Moorshead ............. C03B 25/06 219/388
3,086,764 A * 4/1963 Beck ........................ C21D 1/74 118/732
3,166,397 A * 1/1965 Hohmann ............... C03B 29/08 65/268
3,204,757 A * 9/1965 Zollinger ............... B65G 23/44 110/269
3,514,084 A * 5/1970 Morin .................. C21D 9/0043 432/249
3,724,977 A * 4/1973 Lang ......................... B22F 3/00 266/108
3,776,785 A * 12/1973 McCann ................... C22F 1/04 148/688
3,795,125 A * 3/1974 Laing ........................ F28F 1/12 72/69
3,883,294 A * 5/1975 Ritzmann ............... F27B 21/06 432/107
4,049,472 A * 9/1977 Arndt ....................... C21D 1/76 148/208
4,070,148 A * 1/1978 Campagna .............. F27B 9/021 374/113
4,398,700 A * 8/1983 Thome ................... C21D 9/573 266/102
5,003,160 A * 3/1991 Matsuo .............. G05D 23/1917 219/388
5,345,061 A * 9/1994 Chanasyk .............. B23K 1/008 219/388
5,364,007 A * 11/1994 Jacobs ................. B23K 3/0646 219/390
5,613,185 A 3/1997 Marsden et al.
5,648,042 A * 7/1997 Miller, Jr. ............. C04B 35/584 266/249
5,971,249 A * 10/1999 Berkin ................... B23K 1/008 228/102
5,980,991 A * 11/1999 Sakamoto ............. C03C 17/002 427/374.1
6,123,250 A * 9/2000 De Klein ............... B23K 1/012 228/180.1
6,133,549 A * 10/2000 Shih ..................... C21D 9/0018 198/844.1
6,386,422 B1 * 5/2002 Cheng .................... B23K 1/008 228/46
6,446,855 B1 * 9/2002 Rich ...................... B23K 1/206 134/105
6,495,800 B2 * 12/2002 Richert ............. H01L 21/67115 219/388
6,936,793 B1 * 8/2005 Shiloh .................... B23K 1/008 219/400
2002/0146657 A1 * 10/2002 Anderson .............. B23K 1/008 432/11
2005/0056310 A1 3/2005 Shikata et al.
2005/0161252 A1 * 7/2005 Birgel .................... B23K 1/008 174/260
2005/0279431 A1 * 12/2005 Daito ....................... C21D 8/10 148/593
2007/0267465 A1 * 11/2007 Iketaki ................... B23K 1/008 228/227
2007/0284417 A1 * 12/2007 Yamada ................. B23K 1/008 228/101
2009/0064749 A1 * 3/2009 Hidaka ................... C22C 38/58 72/208
2010/0012705 A1 * 1/2010 Nakamura ........... B23K 1/0016 228/19
2010/0219228 A1 * 9/2010 Yamashita ............. B23K 1/008 228/19
2011/0247202 A1 * 10/2011 Inoue ................... B23K 1/0016 29/705
2012/0003772 A1 * 1/2012 Feldman-Peabody ....................... C23C 14/086 438/61
2012/0055592 A1 * 3/2012 Zurecki .................. C21D 1/667 148/578
2012/0178039 A1 * 7/2012 Kagaya ................ B23K 1/0016 165/177
2012/0187105 A1 * 7/2012 Parks ...................... F27B 9/021 219/388
2012/0240424 A1 * 9/2012 Sugihara ................ B23K 1/012 34/79
2013/0119112 A1 * 5/2013 Sukekawa ............ B23K 1/0016 228/42
2016/0123671 A1 * 5/2016 Frobose .................... F27B 5/10 148/508
2016/0309629 A1 * 10/2016 Nakatsuji ............... H05K 13/08
2017/0183754 A1 * 6/2017 Frost ........................ C21D 9/46

FOREIGN PATENT DOCUMENTS

CN 202328267 U 7/2012
CN 202734503 U 2/2013
DE 3420025 C1 * 10/1985 ........... C21D 9/0043
DE 69817589 T2 6/2004
EP 0914224 B1 12/2001
EP 1222958 A2 7/2002
FR 2673273 A1 * 8/1992 ............... C21D 1/74
GB 666233 A * 2/1952 ............... B21K 1/76
GB 1026618 A * 4/1966 ............. B65G 23/44
GB 1141460 A * 1/1969 ............... C21D 1/74
JP S5976991 U 5/1984
JP S60092071 A 5/1985
JP S6433025 A 2/1989
JP H03039888 A 2/1991
JP 2004277823 A 10/2004

* cited by examiner

CONVEYOR FURNACE

RELATED APPLICATION DATA

This application is a § 371 National Stage Application of PCT International Application No. PCT/EP2014/058809 filed Apr. 30, 2014 claiming priority of DE Application No. 102013104806.4, filed May 8, 2013.

The present invention relates to a conveyor furnace with a muffle, which comprises an inlet opening and an outlet opening, with a heating device for heating a volume delimited by the muffle, and with a closed conveyor belt, which is produced at least partially from metal, wherein a first section of the conveyor belt extends through the muffle, so that, during the operation of the conveyor furnace, a workpiece to be annealed can be conveyed through the inlet opening into the muffle and through the outlet opening out of the muffle, wherein a second section of the conveyor belt extends outside of the muffle, and wherein, during the operation of the conveyor furnace, the first section of the conveyor belt can be moved in a first direction, while, at the same time, an additional section of the conveyor belt can be moved in a second direction which is opposite from the first direction.

Many workpieces have to be annealed after their actual manufacturing, for example, by cold or hot forming, so that the desired material properties are maintained or so that those material properties that have been lost due to forming are restored.

In particular, stainless steel tubes, after cold forming, by cold pilgering or cold drawing, are annealed in order to increase the ductility of the material.

In order to be able to guarantee the highest possible production capacity, the annealing of the workpieces occurs advantageously in a continuous furnace, which is designed as a conveyor furnace, as previously described.

Here, a conveyor belt conveys the workpiece through an inlet opening into the muffle, where the workpiece is annealed, and, after a predetermined time, the workpiece leaves the muffle again on the conveyor belt through the outlet opening of the muffle.

During the annealing of the workpiece in the conveyor furnace, the section of the conveyor belt on which the workpiece to be annealed lies is necessarily also annealed in the furnace, possibly leading, on the one hand, to changes of the conveyor belt itself, and, on the other hand, also to reactions between the conveyor belt and the workpiece.

For example, a conveyor belt which itself is made from stainless steel is itself bright annealed during the heating in the furnace at temperatures above 950° C. If such a bright annealed conveyor belt is introduced again, during the next circulation, together with the workpiece, in particular with a workpiece made of stainless steel, into the muffle of the furnace, the workpiece frequently sticks to the bright mesh belt. To counteract such sticking, the conveyor belts are therefore commonly ground at the time of each circulation.

Therefore, the object of the present invention is to provide a conveyor furnace and a method for annealing a workpiece which prevent such sticking of the workpiece to the conveyor belt.

This object is achieved by a conveyor furnace with a muffle, which comprises an inlet opening and an outlet opening, a heating device for heating a volume delimited by the muffle, and with a closed conveyor belt, which is manufactured at least partially from metal, wherein a first section of the conveyor belt extends through the muffle, so that, during the operation of the conveyor furnace, a workpiece to be annealed can be conveyed through the inlet opening into the muffle and through the outlet opening out of the muffle, wherein a second section of the conveyor belt extends outside of the muffle, and wherein, during the operation of the conveyor furnace, the first section of the conveyor belt can be moved in a first direction, while, at the same time, an additional section of the conveyor belt can be moved in a second direction which is opposite from the first direction, wherein the conveyor furnace comprises a heating device which is arranged so that, during the operation of the conveyor furnace, it heats the second section of the conveyor belt outside of the muffle.

Surprisingly, it has been found that the negative influence undergone by the annealing of the conveyor belt during its passage through the muffle of the conveyor furnace is compensated, since the conveyor belt, at the time of each circulation, after it has left the muffle and before it enters the muffle again, is also heated outside of the muffle.

When the term muffle is used in the present application, it denotes the housing of the furnace enclosing the heated volume.

The muffle can here be manufactured from steel or else from another fire-resistant material, such as chamotte or firebrick, for example.

A heating device in the sense of the present application can be any type of heating device that is capable of heating the volume of the furnace delimited by the muffle or, on the other hand, the conveyor belt outside of the muffle. An example of a heating device is an electric heater or a gas heater.

While, in an embodiment of the invention, the heating device for heating the volume delimited by the muffle and the heating device for heating the second section of the conveyor belt outside of the muffle can be one and the same heating device, an advantageous embodiment of the invention is one in which the heating device for heating the volume delimited by the muffle and the heating device for heating the second section of the conveyor belt outside of the muffle are two mutually separate and preferably mutually independent heating devices.

It should be understood that, in an embodiment, the inlet opening and the outlet opening of the muffle can be designed so that as little energy exchange as possible occurs between the volume delimited by the muffle and the surroundings of the conveyor furnace. For this purpose, in an embodiment, the inlet opening and the outlet opening should be designed to be as small as possible. In embodiments of the invention, the inlet opening and the outlet opening can in addition comprise covers or curtains, which are opened for the workpiece or by the workpiece as it enters or exits the furnace. In an alternative embodiment, the inlet opening and the outlet opening comprise a gas flushing device, wherein the gas flow forms an effective insulation between the heated volume in the muffle and the surroundings of the conveyor furnace, and prevents the penetration of air, but in particular of oxygen, into the heated volume.

In an embodiment of the invention, the conveyor belt is a mesh belt which is formed from multiple mutually interlinked rings. In spite of the fact that such a mesh belt is manufactured at least partially from steel, it has the required flexibility to be used as a conveyor belt.

In an embodiment, the conveyor belt is manufactured here from stainless steel, wherein it is preferable to use for the conveyor belt, in an embodiment, an austenitic highly heat resistant stainless steel alloy, preferably a nickel-iron-chromium solid-solution alloy, for example, Nicrofer 3220 H or Nicrofer 3220 HP manufactured by Thyssen-Krupp. A stainless steel used for manufacturing the conveyor belt preferably has a high tensile strength at high temperatures.

A closed conveyor belt in the sense of the present invention is a circulating conveyor belt, which is arranged so that at all times a first section of the conveyor belt extends through the muffle of the conveyor furnace and is moved in the muffle in a first direction, while an additional section of the conveyor belt is led back, preferably outside of the muffle, and in the process is moved in the opposite direction with respect to the first section of the conveyor belt in the muffle.

It should be understood that embodiments are conceivable in which the first section of the conveyor belt and the section of the conveyor belt that moves in the opposite direction with respect to said first section both extend at least partially through the muffle. On the other hand, embodiments are preferred in which the section moving in the second direction extends outside of the muffle.

While, at first, it is irrelevant for the present invention at what site the second section of the conveyor belt outside of the muffle is heated, in an advantageous embodiment the heating occurs in a section of the belt that moves in the second direction during the operation of the furnace.

Therefore, in an embodiment, the conveyor furnace comprises at least two rollers over which the conveyor belt is deflected, wherein, in an embodiment, one roller (this does not necessarily have to be a deflection roller) is driven by a motor and is in engagement with the conveyor belt, so that a rotating movement of the roller leads to a movement of the conveyor belt.

For the annealing of workpieces made of stainless steel in such a conveyor furnace, the heating device for heating the volume delimited by the muffle is arranged so that it heats the volume delimited by the muffle, during the operation of the conveyor furnace, to a temperature in a range from 950° C. to 1150° C., preferably from 1000° C. to 1100° C., and particularly preferably of 1080° C. At this temperature, stainless steel workpieces can be annealed, while their material properties undergo a positive change in the process.

In contrast, in an embodiment of the invention, the heating device for the conveyor belt is arranged so that it heats the second section of the conveyor belt, during the operation of the conveyor furnace, to a temperature in a range from 300° C. to 500° C., preferably from 350° C. to 450° C., and particularly preferably of 400° C. This means that, outside of the conveyor furnace, no annealing of the mesh belt occurs, but only heating, and as a result, in an embodiment, corrosion of the belt occurs.

Another contributing factor here is that, in an embodiment of the invention, the heating of the second section of the conveyor belt outside of the muffle occurs in a normal ambient atmosphere, i.e., not under a protective gas atmosphere.

In contrast, in an embodiment of the invention, the muffle has a gas inlet which is connected to a reservoir of a protective gas, preferably hydrogen or argon, so that the volume delimited by the muffle, during the operation of the conveyor furnace, can be exposed to a protective gas atmosphere. Such a protective gas atmosphere, in the volume delimited by the muffle, prevents corrosion of the workpiece to be annealed in the muffle.

In an embodiment of the invention, the above-described mesh-belt conveyor furnace is a component of a pilger rolling mill train with a cold pilger rolling mill.

In an alternative embodiment of the invention, the above-described conveyor furnace is a component of a drawing train with a drawing bench for cold forming of tubes.

In addition, the above-mentioned problem is also solved by a method for annealing a workpiece in a conveyor furnace, wherein the conveyor furnace comprises a muffle with an inlet opening and with an outlet opening, a heating device for heating a volume delimited by the muffle, and a closed conveyor belt, which is manufactured at least in part from steel, wherein a first section of the conveyor belt extends through the muffle, wherein the first section of the conveyor belt is moved in a first direction, so that the workpiece to be annealed is conveyed through the inlet opening into the muffle, is heated in the muffle, and is conveyed through the outlet opening out of the muffle, wherein, simultaneously with the movement of the first section, a second section of the conveyor belt is moved in a second direction opposite from the first direction, wherein a second section of the conveyor belt extends outside of the muffle, and wherein the second section of the conveyor belt is heated outside of the muffle by means of a heating device for the conveyor belt.

To the extent that aspects of the invention have been described in regard to the conveyor furnace according to the invention, these aspects also apply to the corresponding method for annealing a workpiece in a conveyor furnace, and vice versa. To the extent that the device is described with certain equipment, the method optionally has corresponding process steps, which describe how the equipment of the device works during the implementation of the method for annealing a workpiece. Conversely, embodiments of the invention are suitable for implementing the embodiments of the method that are described here.

In particular, in an embodiment of the method according to the invention, the workpiece is annealed in the muffle at a temperature in a range from 950° C. to 1150° C., preferably from 1000° C. to 1100° C., and particularly preferably of 1080° C.

In an additional embodiment of the invention, the second section of the conveyor belt is heated outside of the muffle to a temperature in a range from 300° C. to 500° C., preferably from 350° C. to 450° C., and particularly preferably of 400° C.

Additional advantages, features and application possibilities of the present invention become apparent on the basis of the following description of an embodiment and the associated figures.

In the figures, identical elements are marked with identical reference numerals.

FIG. 1 shows a diagrammatic side view of a conveyor furnace 6 which has a design according to the present invention.

Figure 1:
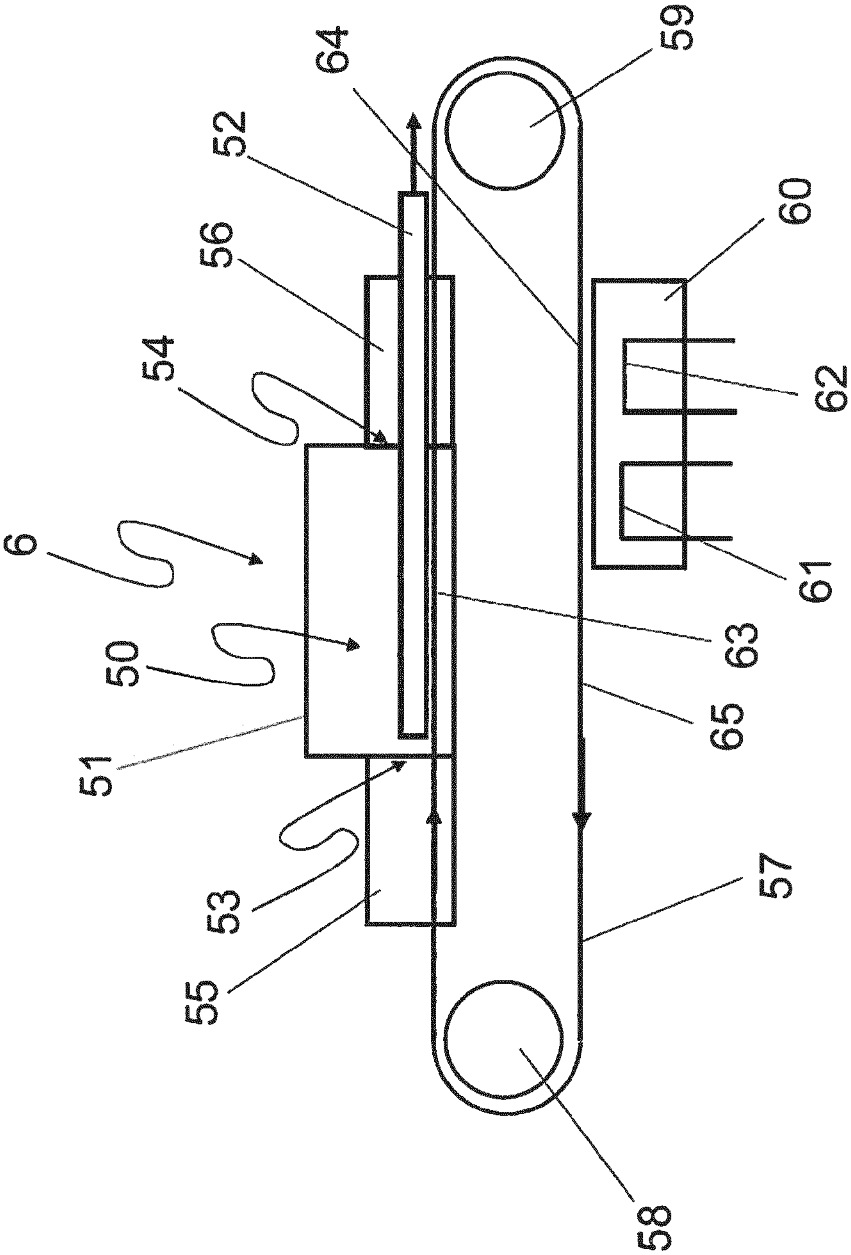
FIG. 1 shows a diagrammatic cross-sectional view of an embodiment of the conveyor furnace according to the invention.

The core of the conveyor furnace 6 is a temperature-controlled volume 50 of the furnace, which is enclosed by a muffle 51. In the volume 50 enclosed by the muffle 51, a workpiece, in this instance a stainless steel tube, is annealed. This annealing occurs at a temperature of 1080° C.

The annealing process here occurs continuously, i.e., a tube 52 is introduced (in the represented embodiment from the left side) into the furnace, so that it is heated slowly to the nominal temperature of 1080° C., wherein the tube is moved continuously in the longitudinal direction through the muffle 51 and then it exits (in the represented embodiment on the right side of the muffle 51) the furnace again.

This means that, while a portion of the tube 52 reaches the nominal temperature within the muffle, other portions of the tube outside of the muffle 51 can either be still before the muffle 51 or already after the muffle 51.

The muffle 51 has an inlet opening 53 and an outlet opening 54, which are open in order to allow a continuous operation of the furnace. In order to prevent unnecessary heat losses in the volume 50 to be heated which is enclosed by the muffle 51, lock chambers 55, 56 are provided before the inlet opening 53 or the outlet opening 54, which are flushed with gaseous hydrogen, in order to keep convection losses of the temperature-controlled volume 50 as low as possible. In addition, the hydrogen flushing in the lock chambers 55, 56 ensures that as little ambient air as possible enters the muffle 51, and the annealing process can occur there under a protective gas atmosphere. In the present case, the annealing in the muffle 51 occurs in a hydrogen environment.

In order to allow a continuous entering and exiting of stainless steel tubes 52 into and out of the furnace 6, the furnace 6 is designed as a conveyor furnace, i.e., it comprises a conveyor belt 57, which, as a closed belt, allows a continuous linear movement of the tubes 52 through the furnace. For this purpose, the conveyor belt 57 is restrained between two rollers 58, 59 which are mounted rotatably about rotation axes. Since the roller 58 is driven by a motor, a rotating movement of the roller 58 is converted to a circulating movement of the conveyor belt 57. a first section 63 of the conveyor belt 57 extends for this purpose through the muffle 51. An additional section 65 of a conveyor belt 57 here moves in a second direction opposite from the direction of movement of the first section 63.

The conveyor belt 57 is a mesh belt made of stainless steel, wherein a SAF 2507 produced by the company Sandvik is used here.

It should be understood that, during the annealing of the workpieces 52 in the furnace 6, the conveyor belt 57 on which the workpiece 52 lies is also annealed. During this annealing, the conveyor belt 57 becomes bright, and occasionally a reaction occurs between the tube 52 to be annealed and the conveyor belt 57, so that the tube 52 to be annealed sticks to the conveyor belt 57. In order to prevent such adhesion of the tube 52 to the conveyor belt 57, the conveyor furnace 6 according to the invention represented here comprises a heating device 60, which is designed as an electric heater and arranged so that the conveyor belt 57, on its way back, is heated outside of the muffle to a temperature of approximately 400° C. Two heating coils 61, 62 are used for heating the heating device 60, in the represented embodiment.

As a result of this heating of a second section 64 of the conveyor belt 57 outside of the muffle 51, i.e., before the reintroduction of the conveyor belt 57 into the tempered volume 50 enclosed by the muffle 51, the conveyor belt 57 is oxidized, and its surface no longer tends to stick to the workpiece 52 to be annealed.

Figure 2:
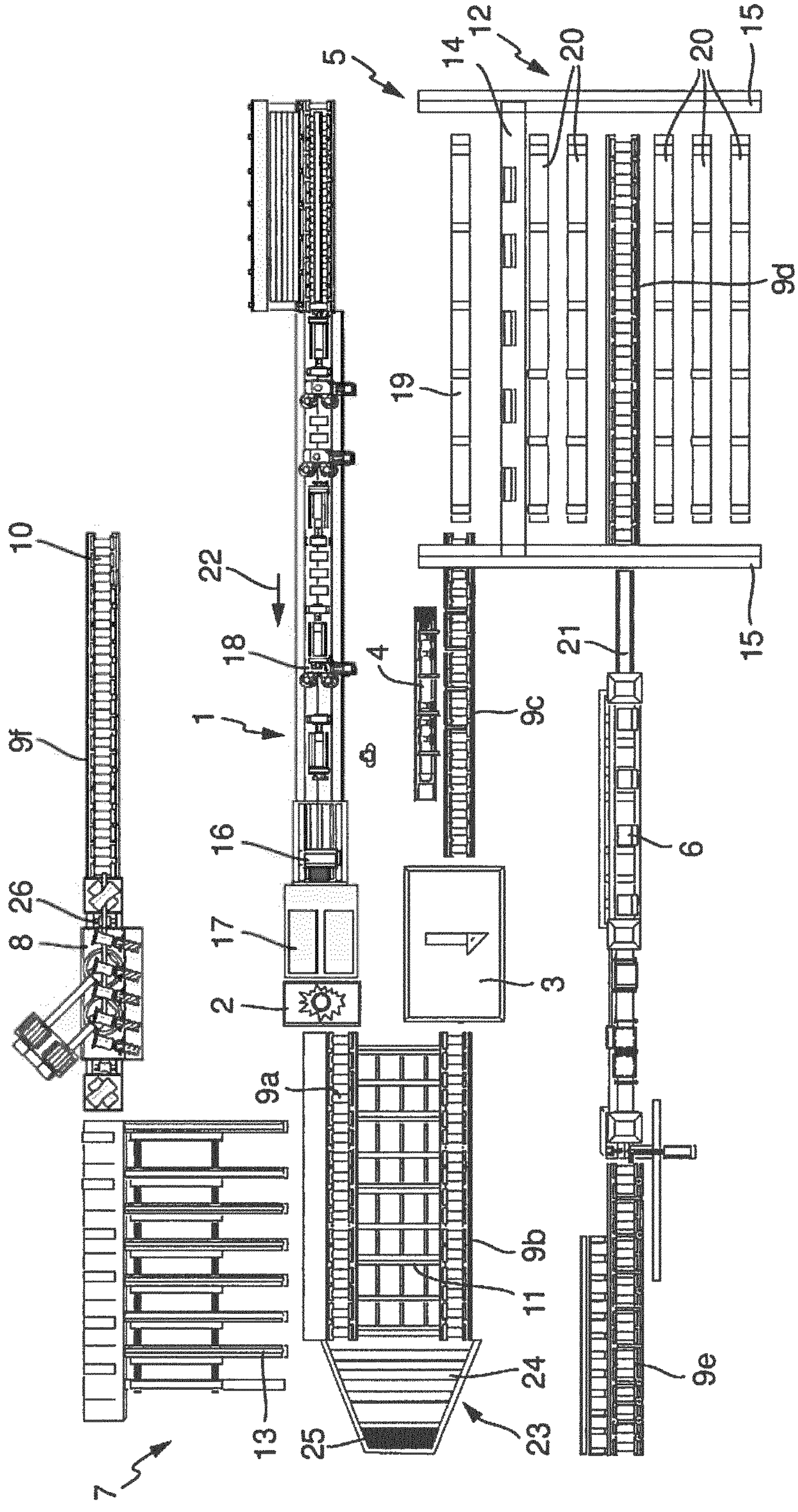
FIG. 2 shows diagrammatically the arrangement of a conveyor furnace according to the invention in a cold pilger rolling mill train.

The rolling mill train depicted in FIG. 2 comprises, in addition to the annealing furnace 6 according to the invention, the following processing stations for producing a high-quality stainless steel tube: a cold pilger rolling mill 1, a device for degreasing 2 the outer wall of the tube, a parting off device 3 for cutting the tube to length, a device for degreasing 4 the tube inner wall as well as for processing the ends of the tube, a first buffer 5 for the tubes, a second buffer 7 for the tubes as well as a straightening machine 8.

In the rolling mill train, the flow direction or conveyance direction of the hollow shell or, after the cold pilger rolling mill 1, of the tube, is from the cold pilger rolling mill 1 to the outlet of the straightening machine 8.

Between the individual process stations 1, 2, 3, 4, 6, 8, automated conveyor devices 9*a*, 9*b*, 9*c*, 9*d*, 9*e*, 9*f* are arranged, which ensure that the tube is conveyed fully automatically from one processing station to the next one, without requiring human intervention.

The depicted embodiment of the rolling mill train comprises, in addition to the roller conveyors 9*a*, 9*b*, 9*c*, 9*d*, 9*e*, 9*f*, conveyor devices 11, 12, 13 at three sites, which convey the tubes in their transverse direction. In this manner, the total length of the rolling mill train is successfully limited, in spite of the large number of processing stations 1, 3, 4, 6, 8. If one views the conveyance path or material flow within the rolling mill train, the rolling mill train has a fold in the path. Here, the conveyance direction of the tube in the rolling mill train changes a total of three times.

The cold pilger rolling mill 1 consists of a rolling stand 16 with rolls, a calibrated rolling mandrel as well as a drive 17 for the rolling stand 16. The drive for the rolling stand 16 has a push rod, a drive motor, and a flywheel. A first end of the push rod is secured eccentrically relative to the rotation axis of the drive shaft on the flywheel. As a result of the action of a torque, the flywheel rotates about its rotation axis. The push rod arranged with its first end with radial separation from the rotation axis is exposed to a tangential force and transmits the latter to the second push rod end. The rolling stand 16, which is connected to the second push rod end, is moved back and forth along the direction of movement 22 established by a guide rail of the rolling stand 16.

During the cold pilgering in the cold pilger rolling mill 1 shown diagrammatically in FIG. 2, the hollow shell introduced into the cold pilger rolling mill 1 in the direction 22, i.e., a raw tube, is fed stepwise in the direction toward the rolling mandrel or over and past said rolling mandrel, while the rolls of the rolling stand 16, as they rotate over the mandrel and thus over the hollow shell, are moved horizontally back and forth. Here, the horizontal movement of the rolls is predetermined by the rolling stand 16 itself, on which the rolls are rotatably mounted. The rolling stand 16 is moved back and forth in a direction parallel to the rolling mandrel, while the rolls themselves are set in their rotating movement by a rack which is stationary relative to the rolling stand 16, and with which toothed wheels that are firmly connected to the roll axles engage.

The feeding of the hollow shell over the mandrel occurs by means of the feeding clamping carriage 18, which allows a translation movement in a direction 16 parallel to the axis of the rolling mandrel. The conically calibrated rolls arranged one above the other in the rolling stand 16 rotate against the feeding direction 16 of the feeding clamping carriage 18. The so-called pilgering mouth formed by the rolls grips the hollow shell, and the rolls push off a small wave of material from outside, which is stretched out by a smoothing pass of the rolls and by the rolling mandrel to the intended wall thickness, until an idle pass of the rolls releases the finished tube. During the rolling, the rolling stand 16 with the rolls attached to it moves against the feeding direction 22 of the hollow shell. By means of the feeding clamping carriage 18, the hollow shell is advanced by an additional step onto the rolling mandrel, after the idle pass of the rolls has been reached, while the rolls with the rolling stand 16 return to their horizontal starting position. At the same time, the hollow shell undergoes a rotation about its axis, in order to reach a uniform shape of the finished tube. As a result of repeated rolling of each tube section, a uniform wall thickness and roundness of the tube as well as uniform inner and outer diameters are achieved.

A central sequential control of the rolling mill train controls all the at first independent processing stations, thus including the drives of the cold pilger rolling mill 1 itself. The control for the cold pilger rolling mill 1 starts with the triggering of a feed step of the drive of the feeding clamping carriage 18 in order to feed the hollow shell. After the feed position has been reached, the drive is actuated in such a manner that it keeps the feeding clamping carriage 18 static. The rotation speed of the drive motor for the rolling stand 16 is controlled so that, simultaneously with the feed step of the feeding clamping carriage 18, the rolling stand 16 is moved back into its starting position, while, after the completion of the feed step, the rolling stand 16 is displaced horizontally over the hollow shell, wherein the rolls roll out the hollow shell again. Once the reversal point of the rolling stand 16 has been reached, the drive of the chuck is actuated in such a manner that the hollow shell is rotated around the mandrel.

After the exit from the cold pilger rolling mill 1, the finished reduced tube is degreased on its outer wall at a degreaser 2. In the represented embodiment of the invention, the finished pilgered tube whose outside has been degreased moves then with a portion of its length into a funnel-shaped arrangement 23, so that a portion of the finished pilgered tube is inserted into a substantially vertical hole 25, in order to save space in the hall where the rolling mill is located.

During the subsequent parting off in the parting off device 3, a lathe tool is rotated about the longitudinal axis of the tube and at the same time it is positioned radially on or in the tube so that the tube is severed and two tube sections are formed.

The parted off tube, i.e., the tube that has been cut to a set length, leaves the parting off device 3, is placed in a degreaser 4 for degreasing the inner wall of the tube. In the represented embodiment, a surface milling of the end sides of the tube (processing of the ends) also occurs in the degreaser 4, so that said end sides exhibit the planarity required for subsequent orbital welding of several tube sections to one another.

In the conveyor furnace 6 designed according to the invention, as shown in detail in FIG. 1, an individual tube or a bundle of tubes is annealed to equalize material properties, i.e., brought to a temperature of 1080° C.

However, it has been found to be disadvantageous that the tubes buckle due to the high temperatures in the annealing furnace 6, and, after leaving the furnace, they are no longer straight, instead they have in particular waves over their longitudinal extent. Therefore, a final processing step is therefore in a so-called cross rolling-straightening machine 8, in which the tubes that leave the furnace 6 are straightened.

In the embodiment represented, after the straightening machine 8, a device for flat grinding is also provided, in which two rotating fleece disks 26 come into a frictional engagement with the finished tube, which has a grinding effect.

For the purpose of the original disclosure, reference is made to the fact that all the features, as they are disclosed to a person skilled in the art from the present description, the drawings and the claims, even if they have been described in concrete terms only in connection with certain additional features, can be combined both individually and also in any desired combinations with other features or groups of features disclosed here, to the extent that this is not explicitly excluded, or to the extent that technical circumstances make such combinations impossible or unreasonable. A comprehensive, explicit description of all the conceivable combinations of features is omitted here only for the sake of the brevity and readability of the description. While the invention has been represented and described in detail in the drawings and in the above description, this representation and this description occur only by way of example and are not intended to limit the scope of protection as defined by the claims. The invention is not limited to the embodiments that have been disclosed.

Variant forms of the disclosed embodiments are evident to the person skilled in the art from the drawings, the description and the appended claims. In the claims, the word "comprise" does not exclude other elements or steps, and the indefinite article "an" or "a" does not exclude a plural. The mere fact that certain features are claimed in different claims does not rule out their combination. Reference numerals in the claims are not intended to limit the scope of protection.

LIST OF REFERENCE NUMERALS

1 Cold pilger rolling mill
2,4 Degreaser
3 Parting off device
5 First buffer
6 Annealing furnace
7 Second buffer
8 Straightening machine
9*a, b, c, d, e, f* Roller conveyor
10 Driven roller
11, 12, 13 Conveyor devices
14 Bridge grab
15 Rails
16 Rolling stand
17 Drive
18 Feeding clamping carriage
19 Intake bench
20 Storage benches
21 Conveyor belt
22 Direction of transport in the rolling mill 1
23 Bottom intake
24 Roll
25 Hole
26 Fleece disks
50 Heated volume
51 Muffle
52 Tube
53 Inlet opening
54 Outlet opening
55, 56 Lock chambers
57 Conveyor belt
58, 59 Rollers
60 Heating device
61, 62 Heating coil
63 First section of the conveyor belt 57
64 Second section of the conveyor belt 57

The invention claimed is:

1. A conveyor furnace comprising:

a muffle having an inlet opening and an outlet opening;

a first heating device for heating a volume delimited by the muffle;

a closed conveyor belt manufactured at least partially from metal, the conveyor belt including a first section extending through the muffle such that, during the operation of the conveyor furnace, a workpiece to be annealed is arranged to be conveyed in through the inlet opening and out through the outlet opening of the muffle, and a second section extending outside of the muffle, wherein, during the operation of the conveyor furnace, the first section of the conveyor belt is arranged to be moved in a first direction, while, at the same time, the second section of the conveyor belt is arranged to be moved in a second direction opposite from the first direction;

a second heating device arranged so that during the operation of the conveyor furnace, the second heating device heats the second section of the conveyor belt under an atmosphere in which oxidation occurs outside of the muffle, wherein the first heating device and the second heating device are mutually separate and mutually independent heating devices; and a first lock chamber before the inlet opening and a second lock chamber after the outlet opening, relative to the first direction in which the first section of the conveyor belt is moved, wherein the first lock chamber and the second lock chamber are each flushed with gaseous hydrogen, wherein the first heating device heats the first section of the conveyor belt while the first section of the conveyor belt travels in the first direction and the second heating device heats the second section of the conveyor belt while the second section of the conveyor belt travels in the second direction.

2. The conveyor furnace according to claim 1, wherein the heating device is arranged so that it heats the volume delimited by the muffle, during the operation of the conveyor furnace, to a temperature in a range from 950° C. to 1150° C.

3. The conveyor furnace according to claim 1, wherein the heating device for the conveyor belt is arranged to heat the second section of the conveyor belt, during the operation of the conveyor furnace, to a temperature in a range from 300° C. to 500° C.

4. The conveyor furnace according to claim 1, wherein the conveyor belt is a mesh belt.

5. The conveyor furnace according to claim 1, wherein the conveyor belt is manufactured from stainless steel.

6. The conveyor furnace according to claim 1, wherein the conveyor belt is manufactured from austenitic stainless steel alloy.

7. The conveyor furnace according to claim 1, further comprising at least two rollers over which the conveyor belt is deflected.

8. The conveyor furnace according to claim 1, further comprising at least one motor driven roller in engagement with the conveyor belt, wherein a rotating movement of the roller leads to a movement of the conveyor belt.

9. The conveyor furnace according to claim 1, wherein the muffle includes a gas inlet connected to a reservoir of protective gas, wherein the volume delimited by the muffle is exposed to a protective gas atmosphere during the operation of the conveyor furnace.

10. A pilger rolling mill train comprising a cold pilger rolling mill and a conveyor furnace, the conveyor furnace having an inlet opening and an outlet opening; a first heating device for heating a volume delimited by the muffle; a closed conveyor belt manufactured at least partially from metal, the conveyor belt including a first section extending through the muffle such that, during the operation of the conveyor furnace, a workpiece to be annealed is conveyed in through the inlet opening and out through the outlet opening of the muffle, and a second section extending outside of the muffle, wherein, during the operation of the conveyor furnace, the first section of the conveyor belt is arranged to be moved in a first direction, while, at the same time, the second section of the conveyor belt is arranged to be moved in a second direction opposite from the first direction; and a second heating device arranged so that during the operation of the conveyor furnace, the second heating device heats the second section of the conveyor belt under an atmosphere in which oxidation occurs outside of the muffle, wherein the first heating device and the second heating device are mutually separate and mutually independent heating devices, wherein the conveyor furnace has a first lock chamber before the inlet opening and a second lock chamber after the outlet opening, relative to the first direction in which the first section of the conveyor belt is moved, wherein the first lock chamber and the second lock chamber are each flushed with gaseous hydrogen, and wherein the first heating device heats the first section of the conveyor belt while the first section of the conveyor belt travels in the first direction and the second heating device heats the second section of the conveyor belt while the second section of the conveyor belt travels in the second direction.

11. A drawing train comprising a drawing bench and a conveyor furnace, the conveyor furnace having an inlet opening and an outlet opening; a first heating device for heating a volume delimited by the muffle; a closed conveyor belt manufactured at least partially from metal, the conveyor belt including a first section extending through the muffle such that, during the operation of the conveyor furnace, a workpiece to be annealed is arranged to be conveyed in through the inlet opening and out through the outlet opening of the muffle, and a second section extending outside of the muffle, wherein, during the operation of the conveyor furnace, the first section of the conveyor belt is arranged to be moved in a first direction, while, at the same time, the second section of the conveyor belt is arranged to be moved in a second direction opposite from the first direction; and a second heating device arranged so that during the operation of the conveyor furnace, the second heating device heating the second section of the conveyor belt extending under an atmosphere in which oxidation occurs outside of the muffle, wherein the first heating device and the second heating device are mutually separate and mutually independent heating devices, wherein the conveyor furnace has a first lock chamber before the inlet opening and a second lock chamber after the outlet opening, relative to the first direction in which the first section of the conveyor belt is moved, wherein the first lock chamber and the second lock chamber are each flushed with gaseous hydrogen, and wherein the first heating device heats the first section of the conveyor belt while the first section of the conveyor belt travels in the first direction and the second heating device heats the second section of the conveyor belt while the second section of the conveyor belt travels in the second direction.

12. A method for annealing a workpiece in a conveyor furnace, the method comprising the steps of:

providing a conveyor furnace, the conveyor furnace including a muffle with an inlet opening and an outlet opening, a first heating device for heating a volume delimited by the muffle, a closed conveyor belt manufactured at least partially from steel, wherein a first section of the conveyor belt extends through the muffle, and a second section of the conveyor belt extends outside of the muffle, and a first lock chamber before the inlet opening and a second lock chamber after the outlet opening, relative to a first direction in which the first section of the conveyor belt is moved, wherein the first lock chamber and the second lock chamber are each flushed with gaseous hydrogen;

moving the first section of the conveyor belt in the first direction so that the workpiece to be annealed is conveyed through the inlet opening into the muffle, is heated by the first heating device in the muffle and conveyed out of the muffle through the outlet opening;

simultaneously moving the second section of the conveyor belt with the movement of the first section in a second direction opposite from the first direction; and heating the second section of the conveyor belt extending outside of the muffle by a second heating device for the conveyor belt under an atmosphere in which oxidation occurs, wherein the first heating device and the second heating device are mutually separate and mutually independent heating devices, and wherein the first heating device heats the first section of the conveyor belt while the first section of the conveyor belt travels in the first direction and the second heating device heats the second section of the conveyor belt while the second section of the conveyor belt travels in the second direction.

13. The method according to claim 12, wherein the workpiece is made of stainless steel.

14. The method according to claim 12, wherein the workpiece in the muffle is heated at a temperature in a range from 950° C. to 1150° C.

15. The method according to claim 12, wherein the second section of the conveyor belt extending outside of the muffle is heated by the second heating device to a temperature in a range from 300° C. to 500° C.

16. The conveyor furnace according to claim 1, wherein the conveyor belt is manufactured from a nickel-iron-chromium solid-solution alloy.

17. The method according to claim 12, wherein the workpiece is a stainless steel tube.

18. The conveyor furnace according to claim 1, wherein both the first section of the conveyor belt traveling in the first direction and the second section of the conveyor belt traveling in the second direction extend at least partially through the muffle.

19. The conveyor furnace according to claim 1, wherein the first heating device for heating the volume delimited by the muffle and the second heating device for heating the second section of the conveyor belt are one and the same heating device.

* * * * *